United States Patent [19]
Pfister

[11] Patent Number: 5,915,898
[45] Date of Patent: Jun. 29, 1999

[54] ADAPTER ARM FOR MACHINE TOOLS

[76] Inventor: Dennis M. Pfister, 1301 Dogwood Trail, Conway, Ark. 72032

[21] Appl. No.: 08/895,602

[22] Filed: Jul. 16, 1997

[51] Int. Cl.[6] .................................................... B23C 1/12
[52] U.S. Cl. ...................... 409/204; 144/135.3; 269/95; 409/206; 409/219; 409/225
[58] Field of Search .................................. 409/144, 204, 409/205, 206, 210, 211, 219, 221, 224, 225, 226; 144/135.3; 269/91, 99, 95

[56] References Cited

U.S. PATENT DOCUMENTS

| | | | |
|---|---|---|---|
| 1,022,874 | 4/1912 | Riddell | 409/205 |
| 1,415,855 | 5/1922 | Anderson | 409/225 |
| 1,828,791 | 10/1931 | Thompson | 409/225 |
| 2,373,267 | 4/1945 | Schultz | 409/226 |
| 3,291,166 | 12/1966 | Mayo | 409/205 |
| 3,923,086 | 12/1975 | Spohn, Jr. | 144/135.3 |
| 4,349,301 | 9/1982 | Boyajian | 29/560 |
| 4,807,861 | 2/1989 | Kimball | 269/75 |
| 5,709,511 | 1/1998 | Esmailzadeh | 409/219 |
| 5,788,434 | 8/1998 | Harmand | 409/225 |

FOREIGN PATENT DOCUMENTS

3407243  8/1995  Germany ................................ 409/205

*Primary Examiner*—Andrea L. Pitts
*Assistant Examiner*—Christopher Kirkman
*Attorney, Agent, or Firm*—Henry C. Query, Jr.

[57] ABSTRACT

The present invention is directed to an adapter arm for coupling a fabrication tool or workpiece to the work table of a machine tool, the adapter arm comprising an elongated shaft having first and second ends, the first end being adapted to be removably connected to the work table, and a clamping device attached to the second end for releasably securing the tool or workpiece to the shaft, whereby movement of the work table is translated to the tool or workpiece through the shaft.

20 Claims, 9 Drawing Sheets

ADAPTER ARM FOR MACHINE TOOLS

BACKGROUND OF THE INVENTION

The present invention relates to an adapter arm for coupling any of a variety of fabrication tools or workpieces to the work table of a machine tool, whereby movement of the tool or workpiece is controlled by the machine tool but the working envelope of the tool or workpiece is offset from the work table.

Typical machine tools, such as milling machines, are capable of performing only a single function, for example cutting metal. If other fabrication functions such as torch cutting or welding are required, additional dedicated, single-purpose machines must be employed. However, for smaller machine shops, owning several single-purpose machines may be cost prohibitive.

In addition, although milling machines may be adapted with various spindles to cut materials other than metal, for example wood, the sawdust and wood chips produced during the cutting operation may be harmful to the cooling system of the milling machine. Moreover, lubricant from the milling machine may soil the workpiece.

SUMMARY OF THE INVENTION

According to the present invention, these and other disadvantages are overcome by providing an adapter arm for coupling a fabrication tool or workpiece to the work table of a machine tool, the adapter arm comprising an elongated shaft having first and second ends, the first end being adapted to be removably connected to the work table, and a clamping device attached to the second end for releasably securing the tool or workpiece to the shaft, whereby movement of the work table is translated to the tool or workpiece through the shaft. In a preferred embodiment of the invention, the clamping device comprises a vise which is pivotally connected to an L-shaped bracket which in turn is pivotally connected to the shaft. In this manner, the tool or workpiece is secured by the vise and may be adjusted in the vertical planes parallel and transverse to the shaft to ensure that the tool or workpiece is appropriately aligned with the work table. In addition, the clamping device may include a linear adjuster connected between the vise and the bracket to enable the tool or workpiece to be adjusted vertically relative to the shaft and, thus, the work table. Furthermore, the adapter arm of the present invention may also comprise a switching device connected between the tool and the machine tool so that activation of the tool may be effected automatically by the machine tool.

The present invention therefore allows any of a variety of tools or workpieces to be connected to the work table of a machine tool. In numerically controlled milling machines, for example, wherein the movement of the work table in the x and y axes is controlled by a computer, the desired movement of the tool or workpiece may be programmed into the milling machine and the movement of the work table will be translated to the tool or the workpiece through the adapter arm. Thus, a single purpose milling machine may be easily transformed with the use of the present invention into a general purpose fabricating machine. Furthermore, the adapter arm transposes the work envelope of the tool or workpiece away from the work envelope of the milling machine so that tools or workpieces that are not necessarily compatible with the milling machine may be used with the milling machine.

These and other objects and advantages of the present invention will be made more apparent by the following detailed description, with reference to the accompanying drawings.

DETAILED DESCRIPTION OF THE PREFERRED EMBODIMENTS

Figure 1:
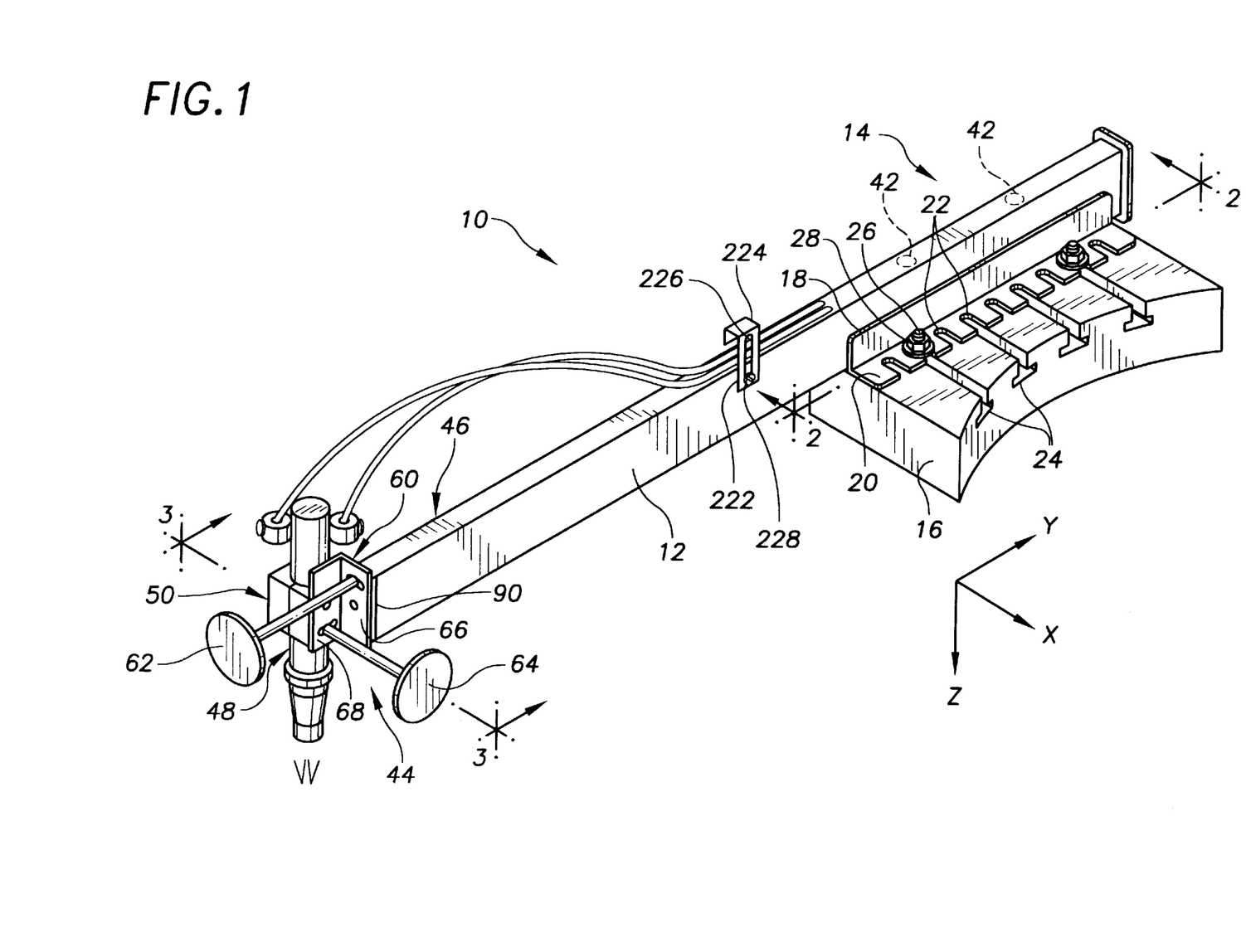
FIG. 1 is a perspective view of one embodiment of the adapter arm of the present invention shown connected to the work table of a machine tool.

Referring to FIG. 1, the adapter arm of the present invention, indicated generally by reference number 10, is shown to comprise an elongated shaft 12 having a first end 14 which is adapted to be removably connected to a work table 16 of a machine tool (not shown). In the preferred embodiment of the invention, the shaft 12 is constructed of a rigid, high strength material, such as tubular steel. Although it is contemplated that the present invention may be used with any type of machine tool having a work table that is movable along at least the x or the y axis as viewed in FIG. 1, the invention is particularly suited for use with numerically controlled machine tools having work tables which are movable in the x-y plane. For simplicity, the present invention will be described herein with reference to a milling machine.

Figure 2:
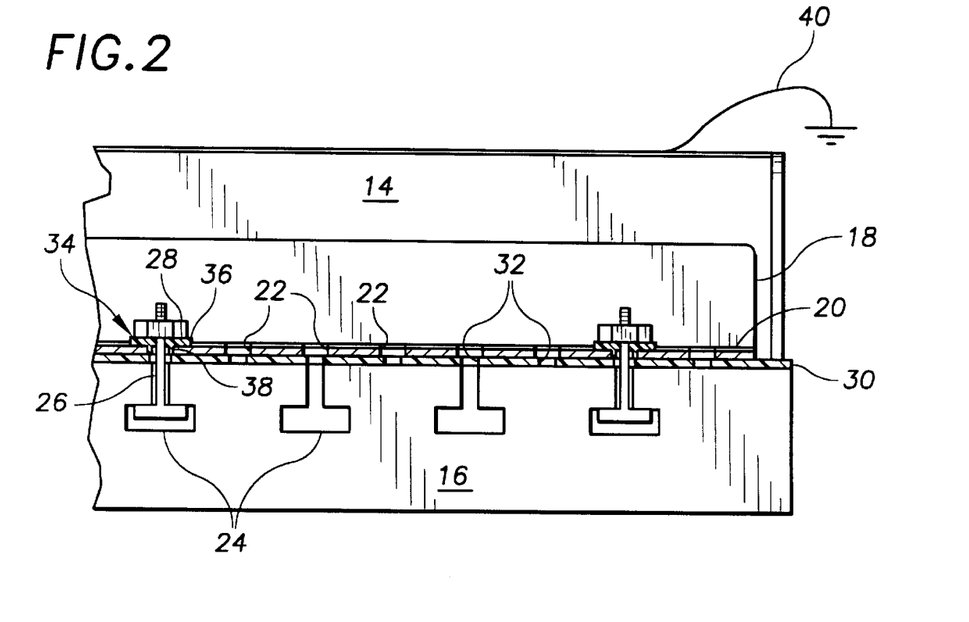
FIG. 2 is a cross-sectional view of a portion of the adapter arm taken along line 2—2 of FIG. 1.

Referring also to FIG. 2, the first end 14 of shaft 12 may be connected to the work table 16 by any of a number of means. In the embodiment depicted in the Figures, the adapter arm 10 includes an attachment plate 18 which is attached to the first end 14 by any suitable means, such as welding, and comprises a horizontal portion 20 which is parallel and preferably flush to the work table 16. Attachment plate 18 comprises a number of preferably evenly spaced apertures 22 formed in portion 20, at least one of which can be aligned with one of several standard T slots 24 formed in the work table 16. A conventional T bolt and nut assembly 26, 28 is positioned in at least one T slot 24 which is aligned with an aperture 22 to thereby secure the attachment plate, and thus the adapter arm 10, to the work table 16.

In certain applications of the present invention, for example where the adapter arm 10 is used in conjunction with an electrically powered tool, it may be desirable to electrically isolate the adapter arm 10 from the milling machine. Referring still to FIG. 2, this may be accomplished with the use of an insulating pad 30 positioned between the attachment plate 18 and the end 14 of shaft 12 on the one hand and the work table 16 on the other. Insulating pad 30 includes a number of apertures 32 ideally corresponding to the number of apertures 22 in attachment plate 18. In addition, each aperture 32 preferably aligns with a corresponding aperture 22. Furthermore, an insulating grommet 34 is preferably employed with each T bolt and nut assembly 26, 28 to ensure that the adapter arm 10 is adequately isolated from the work table 16. Each grommet 34 comprises a radial portion 36 extending between the nut 28 and the horizontal portion 20 of attachment plate 18 and an axial portion 38 extending from the radial portion 36 to the insulating pad 30 between the T bolt 26 and the aperture 22. The insulating pad 30 and grommets 34 are preferably constructed of a non-conductive material which is sufficiently rigid to prevent undesirable movement of the adapter arm 10 relative to work table 16. In addition, an appropriately sized grounding wire 40 may be attached between the shaft 12 and ground to ensure that the adapter arm is adequately grounded.

Other means may alternatively be used to removably connect the shaft 12 to the work table 16. For example, shaft 12 may comprise one or more holes 42 (shown in phantom in FIG. 1) extending completely through the end 14 in a direction perpendicular to the plane of the table 16. An elongated T bolt and nut assembly, similar to assembly 26, 28, may then be used to secure shaft 12 to the table 16 through the holes 42. Alternatively, any structure typically used to secure a workpiece to the work table 16 may be used to removably connect the end 14 to the table 16, such as a vise or a clamp.

Referring again to FIG. 1, the adapter arm 10 also comprises a clamping device 44 connected to the second end 46 of shaft 12. Clamping device 44 is adapted to releasably secure a fabrication tool or workpiece to the adapter arm 10. The motion of the work table along the x and y axes is thus translated to the tool or workpiece through the adapter arm 10, and the movement of the tool or workpiece is therefore controlled by the milling machine. In addition, the working envelope of the tool or workpiece is transposed away from the milling machine by a distance approximately equal to the length of the shaft 12.

Camping device 44 may be used to secure any of a variety of fabrication tools 48 to the adapter arm 10, including, for example, the oxyacetylene cutting torch depicted in FIG. 1. If used in conjunction with a numerically controlled milling machine, the adapter arm 10 can thus temporarily transform the milling machine into a computer controlled flame cutting machine. Other examples of fabrication tools that are especially suited for use with the present invention include a plasma torch, a laser, a welding head, a knife or a plotting pen. Because the adapter arm 10 transposes the working envelope of the tool away from the milling machine, the adapter arm 10 can also be used with certain tools that may not be compatible with the environment of the milling machine, such as a wood router or a water jet. Furthermore, the adapter arm 10 may be used to controllably present a workpiece to a stationary machine, such as a spot welder or a punch. In this manner, the adapter arm 10 is able to adapt a traditionally non-controllable fabrication machine into a computer controlled machine.

Figure 3:
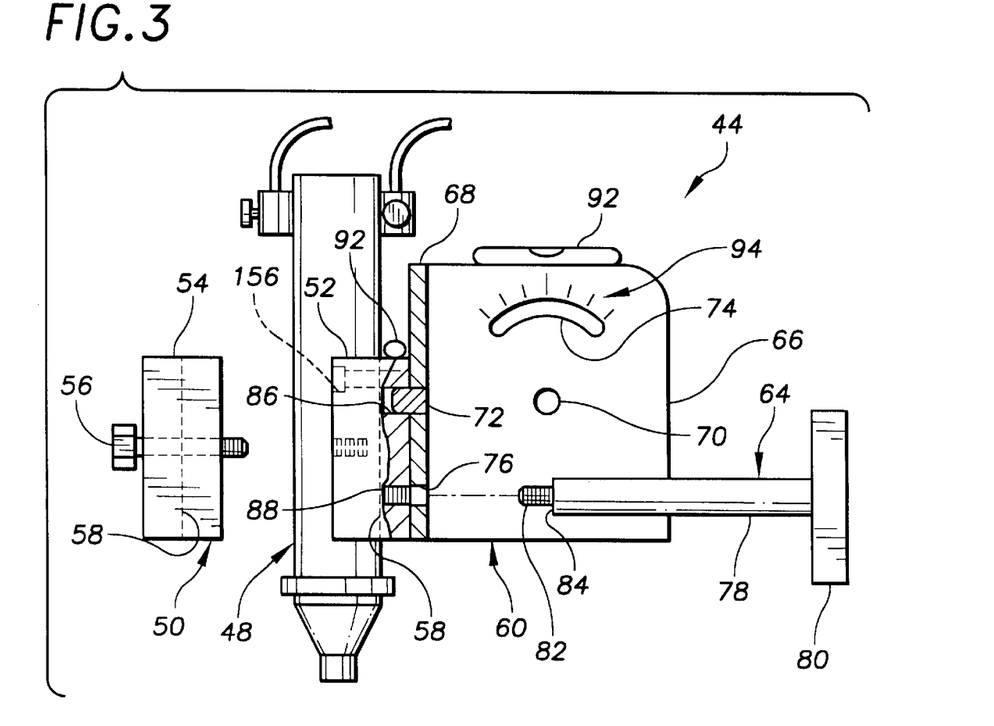
FIG. 3 is a partially exploded cross-sectional view of the clamping device portion of the adapter arm taken along line 3—3 of FIG. 1.

Referring also to FIG. 3, clamping device 44 is shown to comprise a vise 50 having a first jaw 52 connected to a second jaw 54 by preferably two bolts 56, only one of which is visible in FIG. 3. The opposing faces of jaws 52, 54 could have any configuration, but they are preferably adapted to firmly retain the tool with which the adapter arm 10 is intended to be used. For example, in the embodiment illustrated in FIGS. 1 and 3, each jaw 52, 54 comprises a semi-circular groove 58; and when jaws 52, 54 are secured together by bolts 56, grooves 58 face each other and form a retainer for the tool 48.

In the preferred embodiment of the invention, vice 50 is connected to the shaft 12 by a bracket 60 and a pair of clamping knobs 62, 64. Bracket 60 comprises a front plate 66 attached to a side plate 68 by, for example, welding. Front and side plates 66, 68 each comprise a pin 70, 72, respectively, protruding transversely therefrom and a crescent-shaped groove 74, 76, respectively, extending along a predetermined radius from the pins 70, 72. In the embodiment depicted in the Figures, groove 74 is located above the pin 70 while the groove 76 is located below the pin 72. Each clamping knob 62, 64 comprises a shank 78, an enlarged knob 80 attached to one end of the shank 78, a reduced diameter threaded screw portion 82 formed at the distal end of the shank 78 and a shoulder 84 formed between the shank 78 and the screw portion 82.

The vise 50 is pivotally connected to the side plate 68 by pin 72 and knob 64. Pin 72, which may either be welded in a corresponding hole formed in side plate 68 or formed integrally therewith, extends into a bore 86 formed in the first jaw 52 of vise 50. The diameter of bore 86 is sized to be slightly larger than that of pin 72 so as to permit the first jaw 52 to freely pivot about pin 72. The threaded screw portion 82 of clamping knob 64 extends through the crescent-shaped groove 76 in the side plate 68 and engages a somewhat longer threaded hole 88 formed in the first jaw 52. The width of groove 76 is selected to be larger than the diameter of screw portion 82 but smaller than the diameter of shoulder 84 so that, when screw portion 82 is advanced in the threaded hole 88, shoulder 84 will clamp against the side plate 68 and thereby secure the vise 50 to the side plate 68. Consequently, the clamping knob 64 may be loosened to allow the vise 50 to be pivoted about pin 72 within the confines of the crescent-shaped groove 76. In this manner, the vise 50, and thus the tool 48, may be oriented in the vertical plane parallel to the longitudinal axis of the shaft 12.

In a preferred embodiment of the invention, the bracket 60 is pivotally connected to the shaft 12 in a similar manner. The adapter arm 10 includes an end plate 90 which is either formed integrally with or affixed to the shaft 12 by suitable means, such as welding. End plate 90 is provided with a bore and a threaded hole similar to the bore 86 and the threaded hole 88 formed in the first jaw 52 of the vise 50. Pin 70, which may either be welded in a corresponding hole formed in front plate 66 or formed integrally therewith, extends into the bore formed in the end plate 90, and the threaded screw portion 82 of clamping knob 62 extends through the crescent-shaped groove 74 in the front plate 66 and engages the threaded hole formed in the end plate 90 to thereby secure the entire clamping device 44 to the end plate 90. Thus, the clamping knob 62 may be loosened to allow the clamping device 44 to be pivoted about the pin 70 within the confines of the crescent-shaped groove 74. In this manner, the clamping device 44, and thus the tool 48, may be oriented in the vertical plane transverse to the longitudinal axis of the shaft 12.

Clamping device 44 may be provided with level indicators, such as bubble levels 92, for aiding an operator in adjusting the orientation of the tool 48 with respect to the work table 16. In addition, the front and side plates 66, 68 may be provided with pre-determined angle markings 94 adjacent the crescent-shaped grooves 74, 76 to assist the operator in orienting the tool 48 at a desired angle with respect to the work table 16. In the preferred embodiment of the invention, vise 50, clamping knobs 62, 64, front plate 66, side plate 68 and end plate 90 are made of a high strength material, such as steel.

Figure 4:
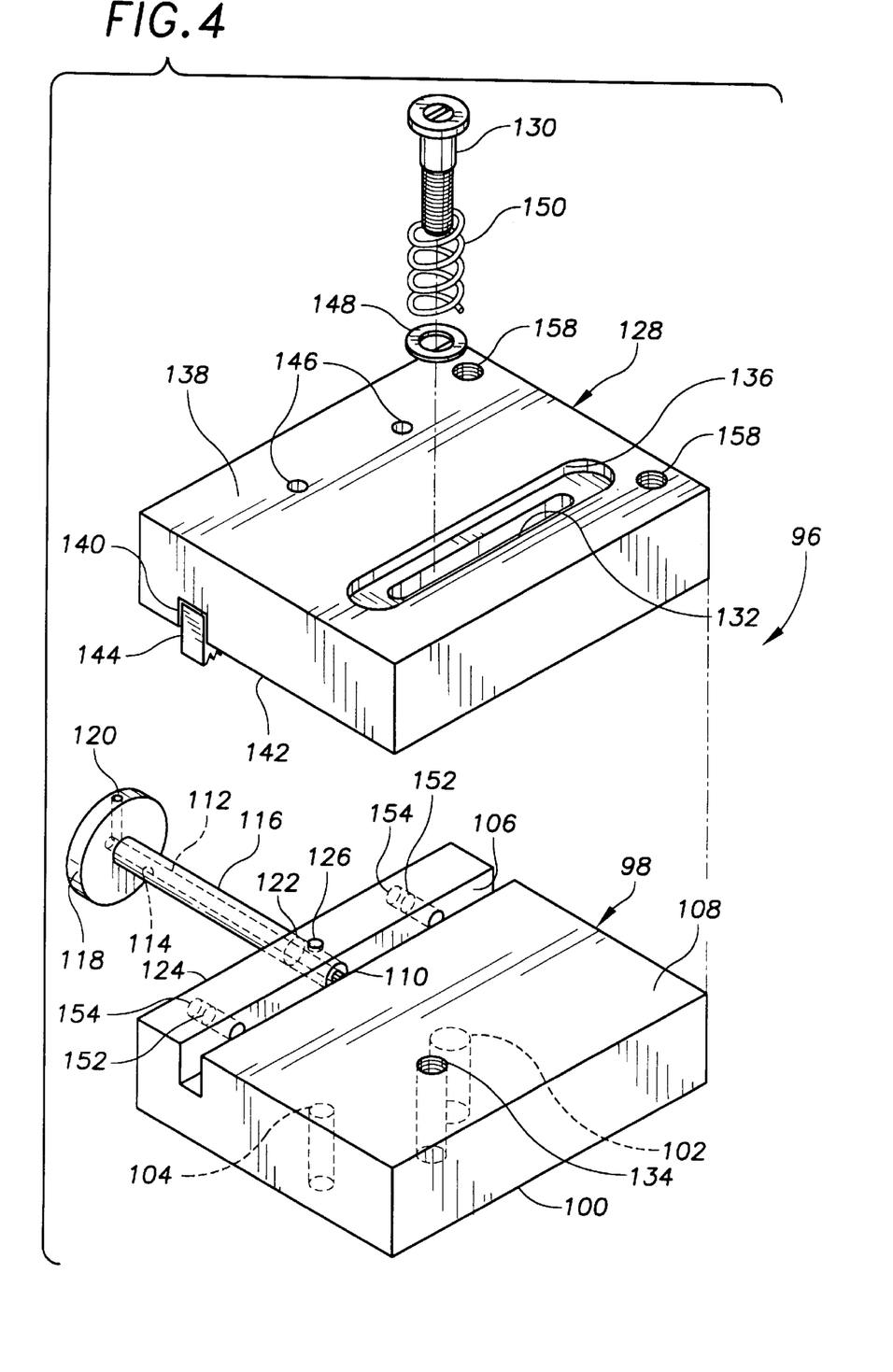
FIG. 4 is an exploded perspective view of the linear adjuster portion of the adapter arm of the present invention.

According to another embodiment of the invention, adapter arm 10 may also comprise means for linearly adjusting the tool 48 with respect to the work table 16. Referring to FIG. 4, adapter arm 10 accordingly comprises a linear adjuster 96, which is preferably connected to the clamping device 44 between the vise 50 and the side plate 68. Linear adjuster 96 comprises a stationary block 98 which is provided on its back side 100 with a central bore 102 and a threaded hole 104 which are similar to the bore 86 and threaded hole 88 formed in the first jaw 52 of vise 50. Bore 102 receives the pin 72 protruding from the side plate 68 and the threaded hole 104 is engaged by the threaded screw portion 82 of clamping knob 64 to pivotally secure the linear adjuster to the side plate 68. An elongated groove 106 is formed in the front side 108 of the stationary block 98, and a pinion 110 extends into the groove 106. The pinion 110 includes an elongated shaft 112 which extends through an axial hole 114 formed in a retainer sleeve 116 and into an axial bore formed in a knob 118. The shaft 112, and thus the pinion 110, is secured to the knob 118 by a set screw 120. The end of the retainer sleeve 116 opposite the knob 118 is received in a bore 122 extending transversely from the groove 106 to the edge 124 of the stationary block 98 and is held therein by a set screw 126. The inner diameter of the axial hole 114 in the retainer sleeve 116 is slightly larger than the diameter of the shaft 112 of the pinion 110 but is smaller than the diameter of the pinion 110. Thus, during assembly the shaft 112 of the pinion 110 is inserted into the axial hole 114 of the retainer sleeve 116, the shaft 112 is secured in the knob 118 by the set screw 120 and the retainer sleeve 116 is secured in the bore 122 by the set screw 126 to thereby rotationally secure the pinion 110 and the knob 118 to the stationary block 98.

The linear adjuster 96 also comprises a movable block 128, which is movably connected to the stationary block 98 by a bolt 130. Bolt 130 extends through an elongated slot 132 formed through the movable block 130 and engages a threaded hole 134 formed in the front side 108 of the stationary block 98. The head of the bolt 130 is preferably recessed in an elongated recess 136 formed in the back side 138 of the movable block 128. The movable block 128 also includes an elongated groove 140 formed in the front side 142 thereof which is in alignment with the groove 106 in stationary block 98 when the linear adjuster 96 is assembled. A rack 144 is positioned in the groove 140 and secured therein by a number of screws 146 extending from the back side 138. When linear adjuster 96 is assembled, rack 144 extends into groove 106 and is engaged by the pinion 110. In this manner, the knob 118 may be turned to move the movable block 128 relative to the stationary block 98.

The extent of permissible movement between the stationary and movable blocks 98, 128 is defined by the length of slot 132. A preferably brass washer 148 is interposed between the recess 136 and the head of the bolt 130 to facilitate sliding movement between the bolt 130 and the movable block 128, and a spring 150 is positioned between the washer 148 and the head of the bolt 130 so that the force of engagement between the stationary and movable blocks 98, 128 may be adjusted. In addition, a pair of preferably brass set screws 152 extending through threaded holes 154 into the groove 106 slideably engage the rack 144 and reduce or eliminate the amount of play between the stationary and movable blocks 98, 128. The remaining components of the linear adjuster 96 are preferably made of high strength material such as steel.

Referring again to FIG. 3, the vise 50 is connected to linear adjuster 96 by preferably two bolts (not shown) which extend through corresponding counter-bored holes 156 in the first jaw 52 (only one of which is visible in FIG. 3) and engage threaded holes 158 formed in the back side 138 of the movable block 128. In this arrangement, the vise 50, and thus the tool 48, may be adjusted vertically by turning the knob 116. Alternatively, the movable block 128 may itself form the first jaw of the vise 50. In this variation, the movable block 128 would be provided with a groove such as groove 58 to receive the tool 48.

It should be noted that the linear adjuster 96 could be used to provide any direction of linear adjustment, depending on how it is connected between the shaft 12 and the vise 50. For example, if the linear adjuster is oriented ninety degrees with respect to the above-described embodiment, the linear adjuster 96 will enable the tool 48 to be adjusted horizontally with respect to the table 16. In addition, two linear adjusters 96 oriented ninety degrees apart may be employed to enable both vertical and horizontal adjustment of the tool 48 with respect to the table 16. Other variations are also considered to be within the scope of the present invention.

Figure 5:
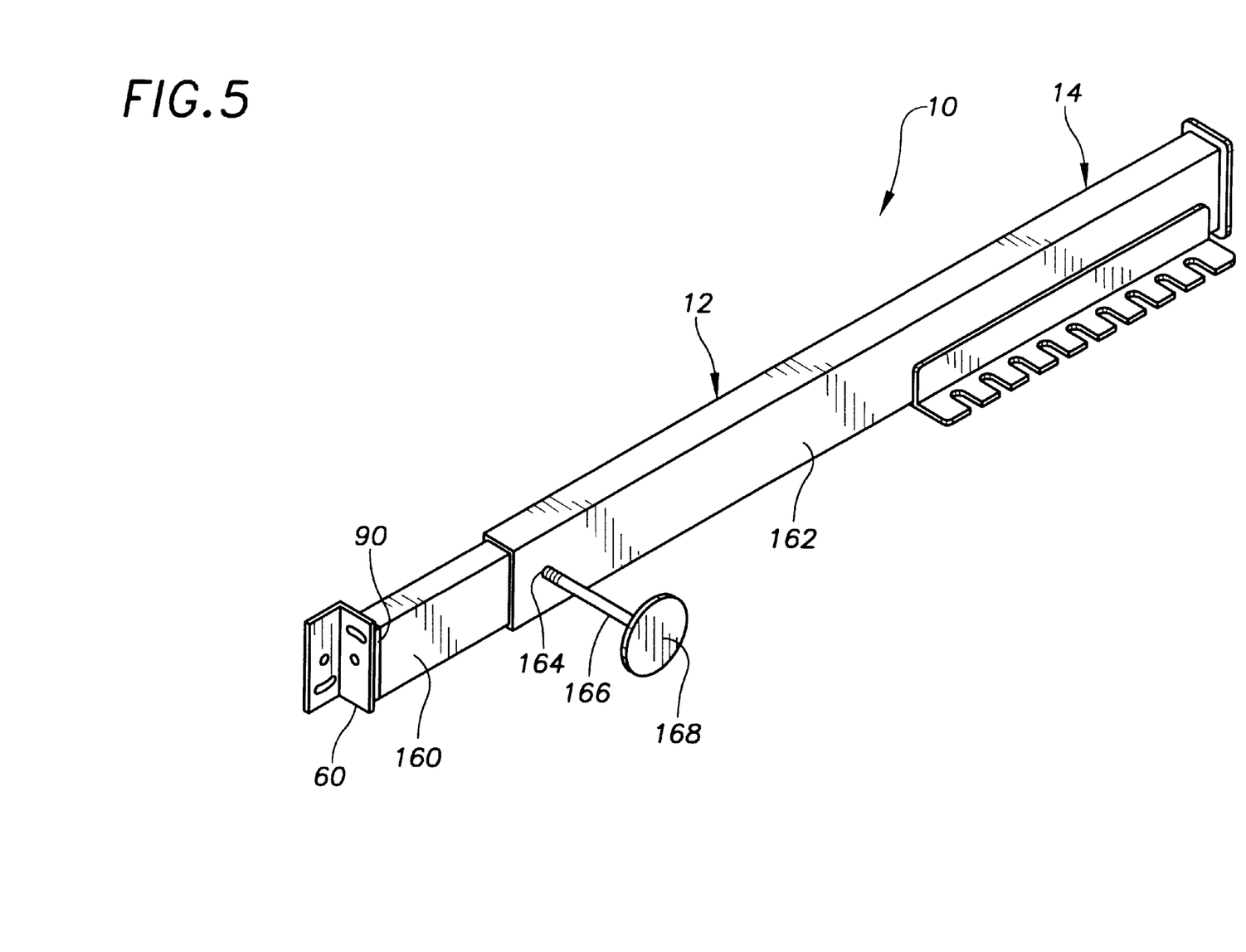
FIG. 5 is a perspective view of another embodiment of the adapter arm of the present invention.

In another embodiment of the invention, which is depicted in FIG. 5, the shaft 12 of adapter arm 10 comprises a first section 160 which is telescopically received in a second section 162. The end plate 90 is connected to the end of the first section 160, and the vise (not shown) is connected to the end plate 90 via the bracket 60 in the manner described above. The second section 162 is provided with a threaded hole 164, and the threaded shank 166 of a knob 168 enters the threaded hole 164 and bears against the first section 160 to secure it in place with respect to the second section 162. In this manner, the knob 168 may be loosened and the first section 160 adjusted longitudinally with respect to the second section 162 to thereby horizontally adjust the tool 48 with respect to the table 16.

Figure 6:
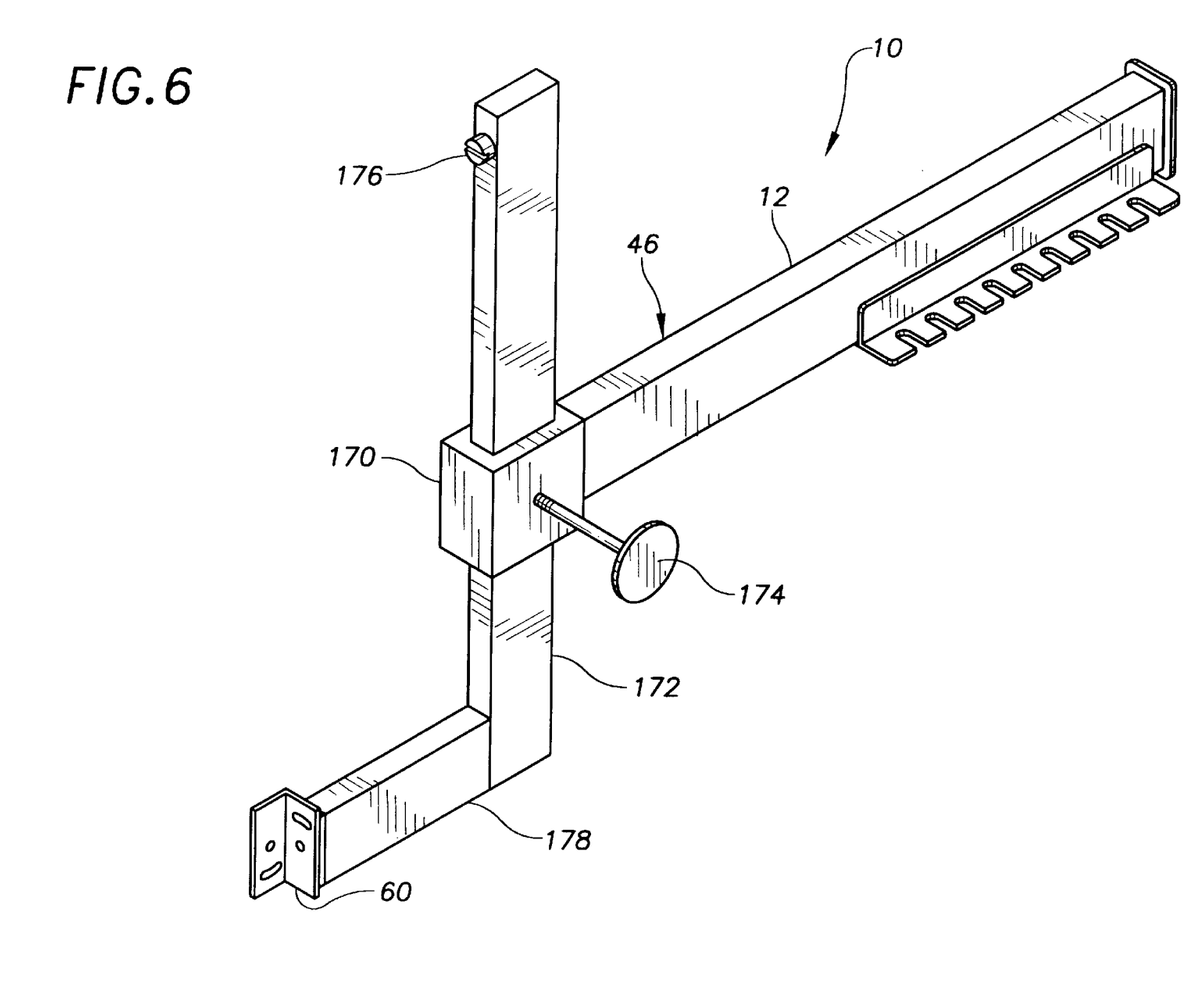
FIG. 6 is a perspective view of a further embodiment of the adapter arm of the present invention.

In a further embodiment of the invention, which is depicted in FIG. 6, adapter arm 10 comprises a collet 170 attached to the second end 46 of shaft 12 by suitable means, such as welding. A leg 172 is slidably supported generally vertically in the collet 170 and is secured therein by a knob 174 in a manner similar to the way knob 168 secures first section 160 in second section 162 in the immediately previous embodiment. A screw 176 secured in the top portion of leg 172 prevents the leg from falling through collet 170. In the embodiment shown in FIG. 6, the bracket 60 is connected to a horizontal branch 178 which in turn is connected to the bottom portion of leg 172. Alternatively, the bracket 60 may be connected directly to the bottom portion of leg 172. In this manner, the tool 48 may be adjusted vertically with respect to the table 16 by loosening knob 174 and sliding leg 172 up or down in collet 170. This embodiment is particularly suitable to applications involving workpieces which are too large or heavy to mount on the table 16 and therefore are more conveniently positioned on or near the ground.

Although not specifically depicted in the drawings, the embodiments of FIGS. 5 and 6 may be combined. In this variation of the invention, the collet 170 is connected to the free end of first section 160, and the tool 48 may therefore be adjusted both horizontally and vertically with respect to the table 16.

Figure 7:
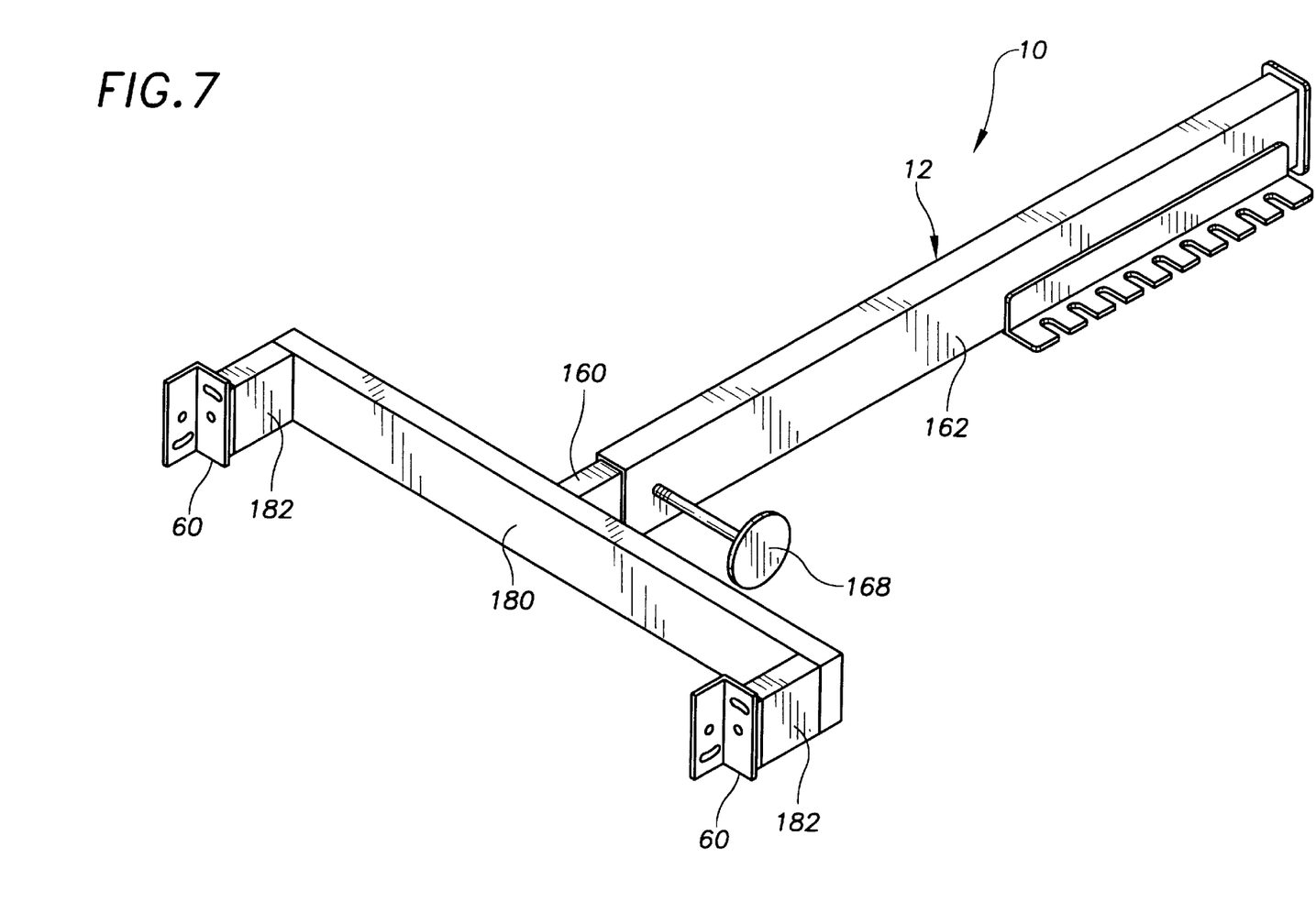
FIG. 7 is a perspective view of yet another embodiment of the adapter arm of the present invention.

Referring to FIG. 7, another embodiment of the adapter arm 10 is shown in which more than one tool 48 may simultaneously be coupled to the table 16. The adapter arm 10 of this embodiment is similar to that depicted in FIG. 5, but also includes a cross beam 180 connected to the free end of the first section 160 of shaft 12 by suitable means, such as welding. In this embodiment, the bracket 60 associated with each tool is connected to the cross beam 180 via a transverse segment 182, each of which is preferably welded to the cross beam 180. Alternatively, brackets 60 may be connected directly to cross beam 180. Although FIG. 7 depicts only two brackets 60, an adapter arm 10 according to this embodiment may actually employ any number of brackets 60, depending on the number of tools desired to be simultaneously coupled to table 16.

In addition, the embodiments of FIGS. 5 and 6 may be combined with the embodiment of FIG. 7 so that the tools may be positioned horizontally or vertically, or both, with respect to each other. Thus, cross beam 180 may be provided with a first branch which is connected to the first section 160 of shaft 12 and second and third branches which are telescopically received in the first branch and which in turn support the brackets 60. In this manner, the tools may be moved horizontally either apart or together. Additionally, collets similar to collet 170 may be connected to the ends of the second and third branches, and the brackets 60 may be attached to legs which are slidably received in the collets. In this manner, the tools may be adjusted vertically relative to each other.

Figure 8:
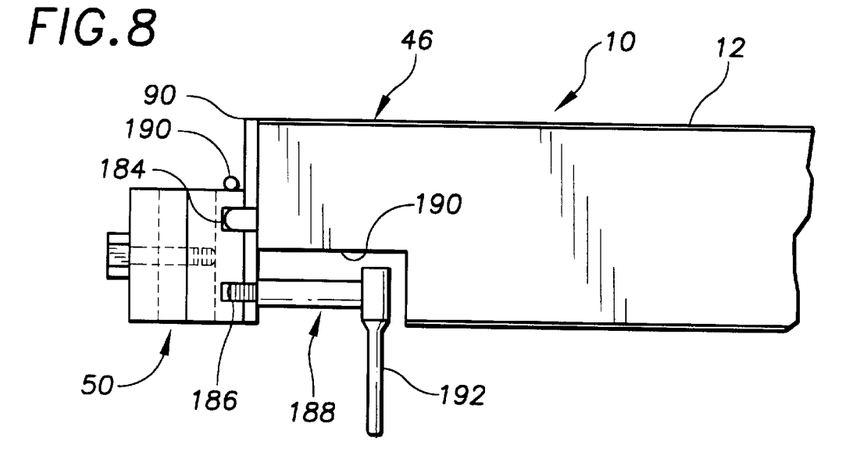
FIG. 8 is a cross-sectional view of the clamping device portion of another embodiment of the present invention.

Although the previous embodiments of adapter arm 10 include a bracket 60 for connecting the vise 50 to the shaft 12, any of a variety of means may be employed for this function. Referring to FIG. 8, the vise 50 is pivotally connected directly to the end 46 of the shaft 12. In this embodiment, end plate 90 is provided with a protruding pin 184 and a crescent-shaped groove 186 similar to pin 72 and groove 76 formed in the side plate 68 described in the FIG. 3 embodiment of the invention. Accordingly, vise 50 is pivotally secured to the end plate 90 with a clamping knob 188 in a manner similar to which it is secured to the side plate 68 in the FIG. 3 embodiment. In the embodiment shown in FIG. 8, the second end 46 of shaft 12 includes a cut-out portion 190 to accommodate the clamping knob 188. In addition, clamping knob 188 preferably comprises an elongated handle 192 extending below shaft 12 to allow for easy actuation of the clamping knob 188. Furthermore, a level indicator 190 may be attached to the vise 50 to aid in orienting the tool in the vertical plane transverse to shaft 12.

Figure 9:
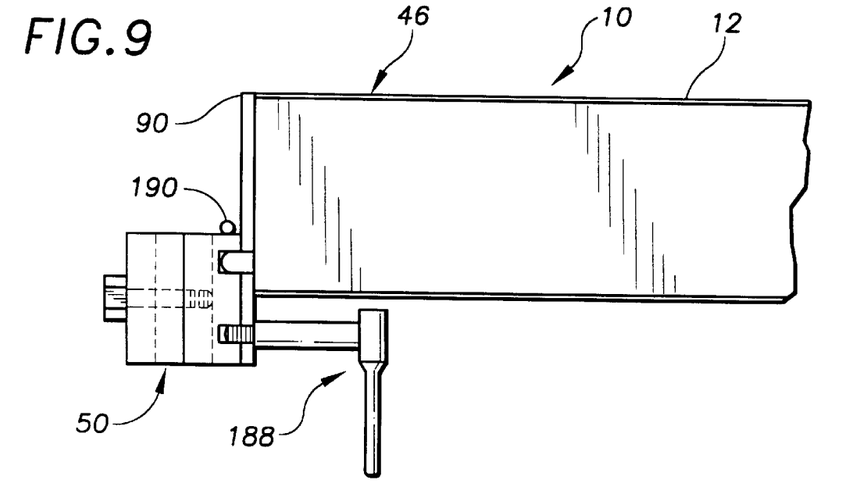
FIG. 9 is a cross-sectional view of the clamping device portion of a further embodiment of the present invention.

The adapter arm 10 illustrated in FIG. 9 is similar in many respects to the embodiment depicted in FIG. 8. However, in this embodiment the second end 46 of shaft 12 does not include a cut-out portion 190 for the clamping knob 188. Instead, end plate 90 is sufficiently elongated to extend below the bottom of shaft 12. The vise 50 is accordingly pivotally secured to the end plate 90 such that the clamping knob 188 is located below shaft 12.

Figure 10:
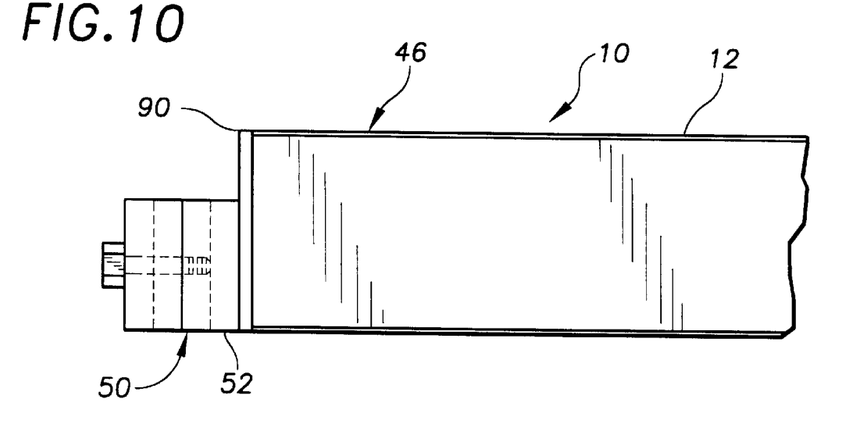
FIG. 10 is a cross-sectional view of the clamping device portion of yet another embodiment of the present invention.

In the embodiment of adapter arm 10 depicted in FIG. 10, the first jaw 52 of vise 50 is rigidly connected to the end plate 90, such as by welding. Alternatively, the first jaw 52 may be connected directly to shaft 12 in the absence of an end plate 90. In this embodiment, the vise 50, and thus the tool 48, cannot pivot with respect to the second end 46 of the shaft 12.

Figure 11A:
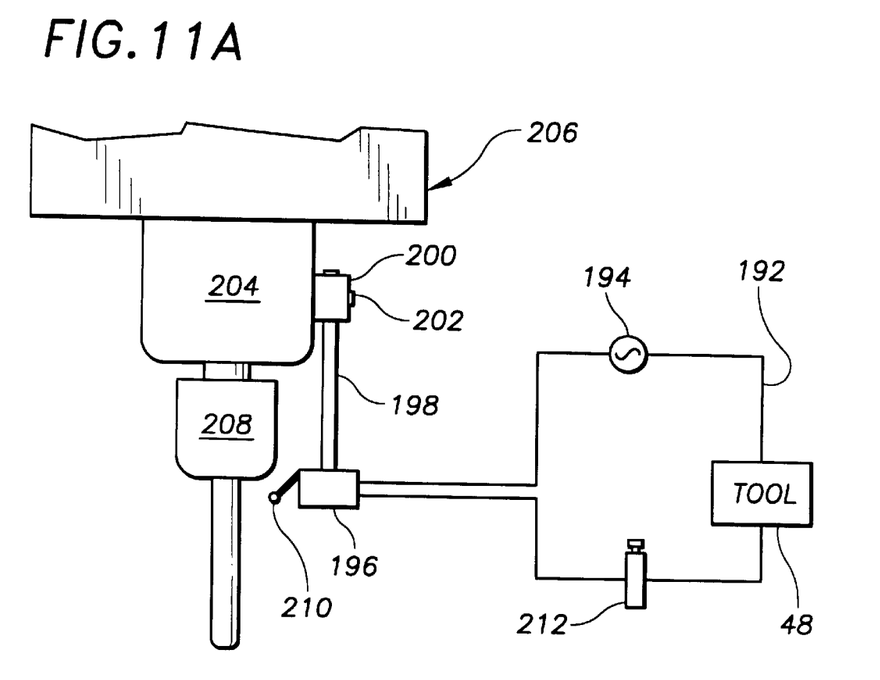
FIG. 11A is a schematic view of the switching device portion of the present invention in the un-actuated position.
Figure 11B:
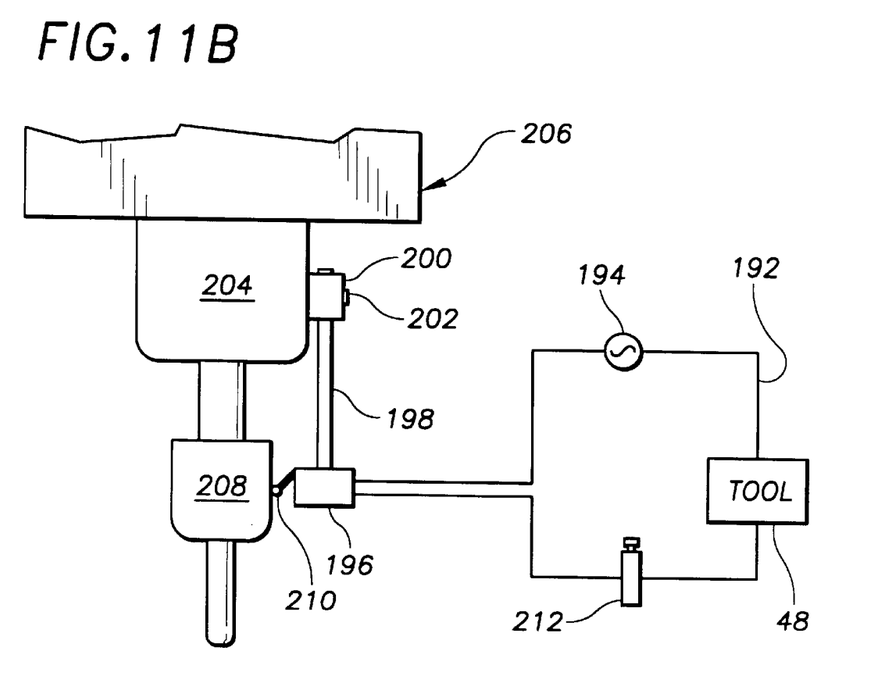
FIG. 11B is a schematic view of the switching device portion of the present invention in the actuated position.

Referring now to FIGS. 11A and 11B, the adapter arm of the present invention may also include a switching device to automatically activate certain electrically powered tools and tools which comprise electro-mechanical valves, such as the oxygen valve in the oxyacetylene cutting torch depicted in FIG. 1. In this embodiment, the adapter arm 10 (not shown) carries a power cord 192 which is connected between a power supply 194 and the tool 48 mounted to the adapter arm 10. A preferably mechanically actuated switch 196 is connected between the power supply 194 and the tool 48. The switch is attached to a rigid extension leg 198 which is slidably supported in a collar 200 and secured therein by a set screw 202. The collar 200 in turn is connected to the non-rotating machine head 204 of the milling machine 206 by suitable means, such as screws. In order to activate the tool 48, the milling machine is programmed to lower the spindle 208 immediately prior to moving the table 16. As the spindle 208 is lowered, as shown in FIG. 11B, it will engage a plunger 210 of the switch 196 to close the circuit and allow current to flow to the tool 48. The extension leg 198 is preferably made of a non-conducting material to electrically isolate the switching device and the tool 48 from the milling machine 206.

In order to prevent accidental activation of the tool 48, the adapter arm 10 may also be provided with a manual switch 212 connected between the switch 196 and the tool 48. In this manner, both switches 196 and 212 are required to be actuated in order to activate the tool 48. Alternatively, adapter arm 10 may be provided with only the manual switch 212. Switch 212 may be either hand held or mounted to shaft 12, for example adjacent the end 46.

Figure 12:
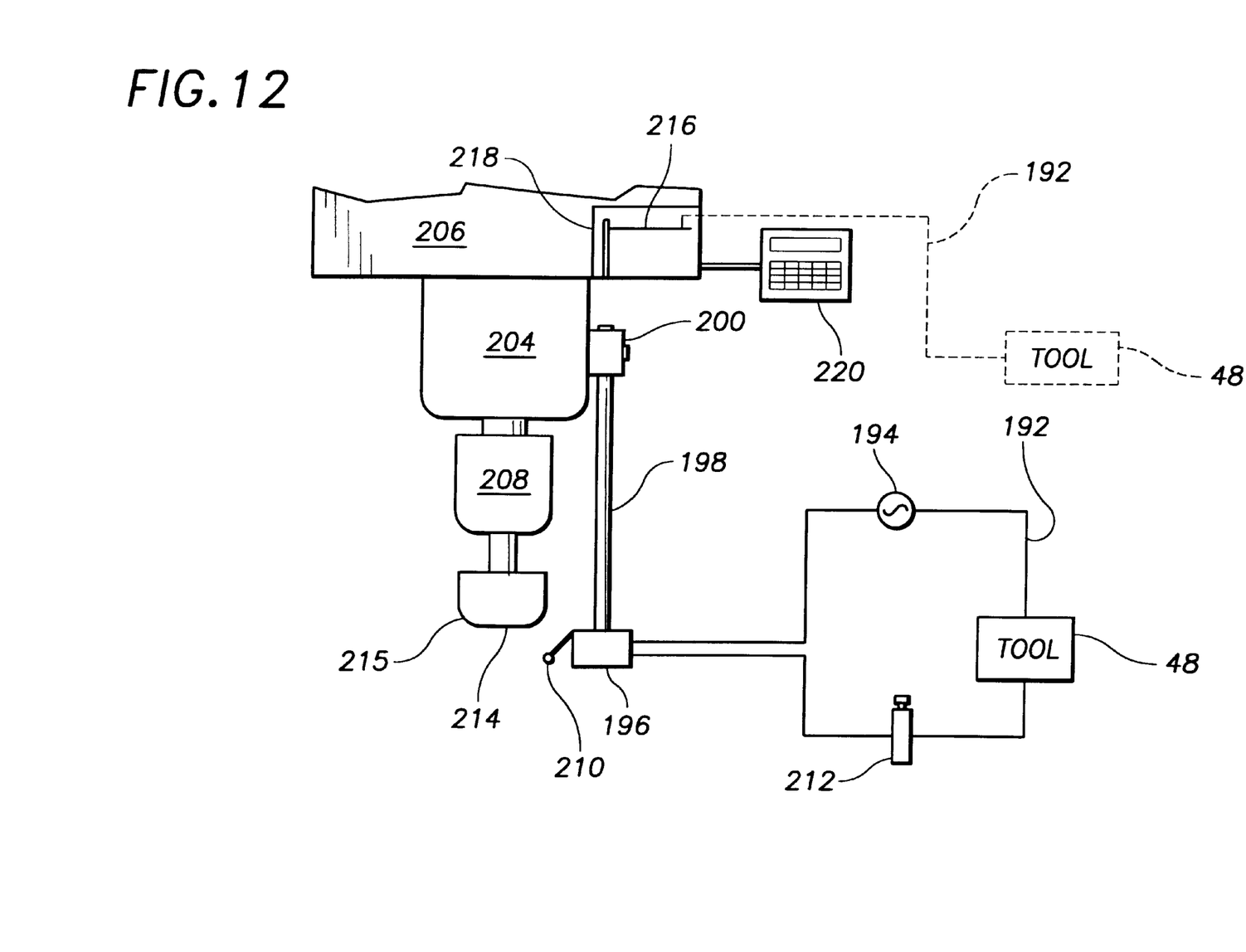
FIG. 12 is a schematic view of the switching device portion of another embodiment of the present invention.

The embodiment depicted in FIG. 12 is similar to the embodiment illustrated in FIGS. 11A and 11B. However, in this embodiment the switch 196 is actuated by a special actuation tool 214 mounted in the spindle 208, rather than directly by spindle 208. The actuation tool 214 may be provided with a downward facing conical shoulder 215 which is adapted to smoothly engage the plunger 210.

An alternative to the embodiments depicted in FIGS. 11 and 12 is shown in phantom in FIG. 12. In this embodiment, the power cord 192 is plugged directly into a control card 216 contained within the control box 218 of the milling machine. The milling machine can then be programmed through its conventional console 220, for example using its M function, to activate the tool 48 at the desired time.

Referring again to FIG. 1, the adapter arm 10 may also comprise a tie 222 for securing the power cord 192, or any other supply conduit, such as the gas supply tubes for the oxyacetylene cutting torch depicted in FIG. 1, to the shaft 12. The tie 222, which is preferably constructed of metal, includes a clamping portion 224 which is adapted to close against the shaft 12. In the embodiment depicted in FIG. 1, tie 222 also includes an elongated slot 226 and a screw 228 which extends through the slot 226 and into a corresponding hole in the shaft 12 to slidably secure the tie 222 to the shaft 12. The head of the screw 228 is larger than the width of the slot 226, and the tie 222 may therefore be secured to the shaft 12 by tightening the screw 228. In this manner, the tie 222 can be closed over the power cord or supply conduit and secured in place by the screw 228.

It should be recognized that, while the present invention has been described in relation to the preferred embodiments thereof, those skilled in the art may develop a wide variation of structural and operational details without departing from the principles of the invention. For example, the various components illustrated in the different embodiments may be combined in a manner not illustrated above. Therefore, the appended claims are to be construed to cover all equivalents falling within the true scope and spirit of the invention.

What is claimed is:

1. A device for coupling at least one fabrication tool or workpiece to the work table of a machine tool, the device comprising:

an elongated shaft having first and second ends;

the first end being removably connectable to the work table; and a clamping device connected to the second end for releasably securing the tool or workpiece to the shaft;

wherein the tool or workpiece is positioned away from the machine tool;

whereby movement of the work table is translated to the tool or workpiece through the shaft.

2. The device of claim 1, further comprising means for linearly adjusting the tool or workpiece with respect to the work table.

3. The device of claim 2, wherein the linear adjusting means comprises a movable block movably connected to a stationary block and means for manually moving the movable block relative to the stationary block, wherein the stationary and movable blocks are connected between the clamping device and the second end of the shaft.

4. The device of claim 3, wherein the manual moving means comprises a rack connected to the movable block, a pinion rotationally connected to the stationary block which engages the rack, and a manually rotatable knob connected to the pinion, whereby rotation of the knob causes the movable block to move relative to the stationary block.

5. The device of claim 4, further comprising means for adjusting the force of engagement between the stationary and movable blocks.

6. The device of claim 2, wherein the linear adjusting means comprises a first section of the shaft which is telescopically received in a second section of the shaft and means for securing the first section to the second section.

7. The device of claim 2, wherein the linear adjusting means comprises a collet connected to the second end of the shaft, a leg which is slidably supported in the collet and means for securing the leg to the collet, wherein the clamping device is connected to the leg.

8. The device of claim 1, further comprising means for angularly orienting the tool or workpiece with respect to the table.

9. The device of claim 8, wherein the angular orienting means comprises a first plate connected to the second end of the shaft, a first pin protruding from the first plate, a first crescent-shaped groove extending through the first plate at a predetermined radius from the first pin, a first bore formed in the clamping device which is adapted to pivotally receive the first pin, a first threaded hole formed in the clamping device in alignment with the first groove, and a first knob having a threaded shaft which extends through the first groove and engages the first hole to thereby secure the clamping device to the first plate, whereby the first knob may be loosened and the clamping device oriented in a first plane perpendicular to the first pin.

10. The device of claim 9, wherein the angular orienting means further comprises a second plate connected to the first plate at a predetermined angle, a second pin protruding from the second plate, a second crescent-shaped groove extending through the second plate at a predetermined radius from the second pin, a second bore formed in the second end of the shaft which is adapted to pivotally receive the second pin, a second threaded hole formed in the second end of the shaft in alignment with the second groove, and a second knob having a threaded shaft which extends through the second groove and engages the second hole to thereby secure the clamping device to the shaft, whereby the second knob may be loosened and the clamping device oriented in a plane perpendicular to the second pin.

11. The device of claim 1, further comprising means for connecting more than one tool or workpiece to the shaft.

12. The device of claim 11, wherein the connecting means comprises a cross beam connected to the second end of the shaft and two or more clamping devices connected to the cross beam.

13. The device of claim 1, further comprising means for electrically insulating the device from the work table.

14. The device of claim 1, wherein the tool comprises an electrically powered component and the device further comprising means for activating the tool.

15. The device of claim 14, wherein the activating means comprises a mechanical switch connected between a power source and the tool and means for fixedly securing the switch relative to the machine tool, wherein the switch is adapted to be actuated by a movable portion of the machine tool.

16. The device of claim 15, wherein the securing means comprises a leg having a first end which is supported in a collar which in turn is connected to a non-rotatable portion of the machine tool and a second end to which the switch is connected, wherein the switch is supported by the leg in a position to be actuated by the movable portion of the machine tool.

17. The device of claim 14, wherein the activating means comprises a control card which is plugged into a control box of the machine tool and wherein the machine tool is programmed to automatically activate the tool.

18. The device of claim 14, wherein the activating means comprises a manually-actuatable switch connected between the tool and a power source.

19. A device for coupling at least one fabrication tool to the work table of a machine tool, the device comprising:

an elongated shaft having first and second ends;

means for removably connecting the first end to the work table; and means connected to the second end for releasably securing the tool to the shaft;

wherein the tool is positioned for operation on a workpiece located apart from the machine tool;

whereby movement of the work table is translated to the tool through the shaft.

20. The device of claim 19, wherein the removably connecting means comprises at least one bolt having a first portion which is coupled to the work table and a second portion which is secured to the first end.

* * * * *